Jan. 9, 1968
C. A. NEUGEBAUER
3,362,214
EVAPORATION RATE METER
Filed Dec. 7, 1964
2 Sheets-Sheet 1
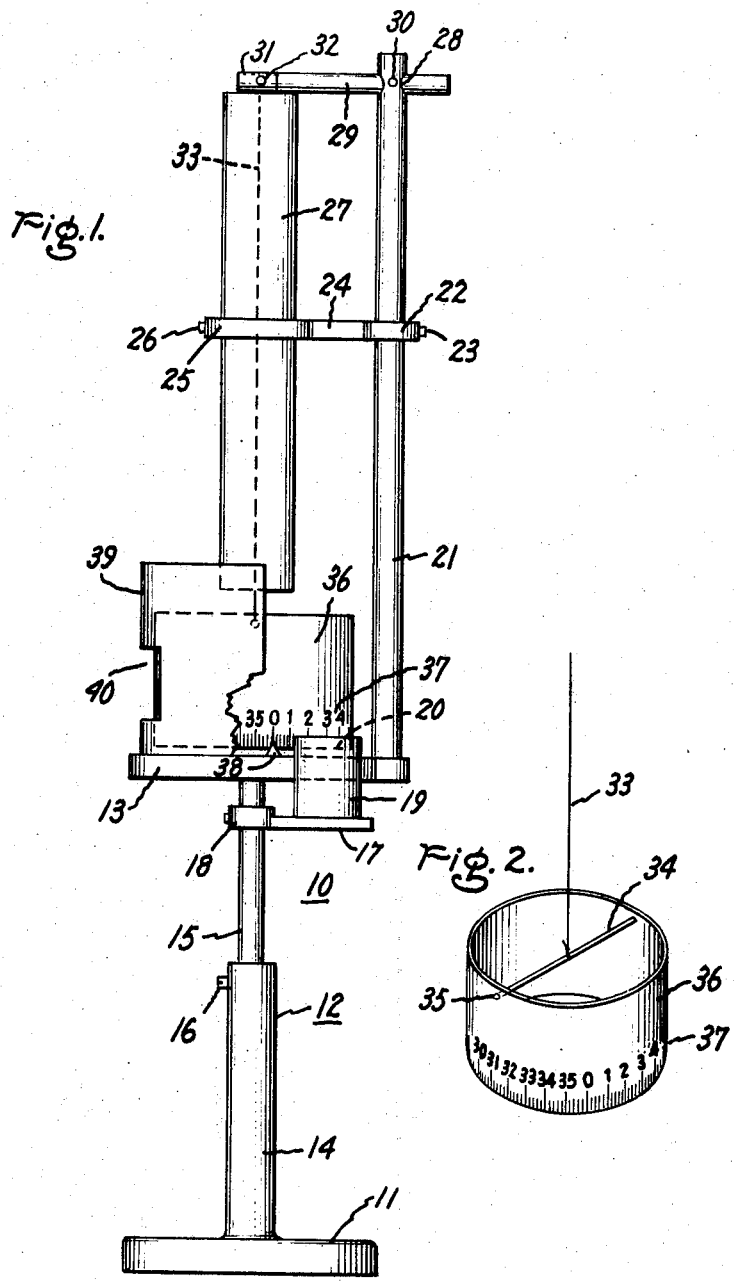
Inventor:
Constantine A. Neugebauer,
by Paul R. Webb, II
His Attorney.

Jan. 9, 1968

C. A. NEUGEBAUER 3,362,214

EVAPORATION RATE METER

Filed Dec. 7, 1964

Inventor:
Constantine A. Neugebauer,
by Paul R. Webb II
His Attorney.

United States Patent Office 3,362,214
Patented Jan. 9, 1968

3,362,214
EVAPORATION RATE METER
Constantine A. Neugebauer, Schenectady, N.Y., assignor to General Electric Company, a corporation of New York
Filed Dec. 7, 1964, Ser. No. 416,313
3 Claims. (Cl. 73—15)

ABSTRACT OF THE DISCLOSURE

The evaporation rate of a tin source is measured by an evaporation rate meter comprising a hollow aluminum cylinder rotatably suspended by a small diameter tungsten wire. The aluminum cylinder is partly shrouded by a fixedly positioned, apertured semicylindrical shield to control the impinging direction of an evaporant stream and the suspended aluminum cylinder is rotated about its axis, under the force of a momentum exchange with the evaporant stream, to an angular position proportional to the evaporation rate of the source. Magnetic damping in the form of an arcually grooved magnet serves to inhibit oscillation of the aluminum cylinder.

This application relates to a rate meter and more particularly to a rate meter for measuring the evaporation rate of a material.

In an article entitled, "The Simultaneous Vapor Deposition of Two Component Systems," by D. S. Campbell and H. Blackburn on pages 313 and 314 of the "Transactions of the Seventh National Vacuum Symposium," published by Pergamon Press, Inc., New York, 1960, there is described an evaporation rate meter. This article discusses the effect of the simultaneous evaporation of zinc sulphide and lithium fluoride onto the same area glass substrate. On page 314 of the article the assembly of the rate meter is described by setting forth that the movement of a moving coil microammeter was taken, the stub on the opposite side of the moving coil to the pointer was extended and a vane was attached to it. Any force exerted on the vane could then be balanced by a current through the coil sufficient to keep the pointer in the same place on the meter scale. The instrument was located in a bell jar so the vane would intercept part of the vapor stream from the source. The current required to keep the vane stationary in the stream was then a measure of the momentum transferred to it by the reflection of particles from or their deposition on the surface. The deflection and thus the restoring current could be taken as proportional to the mass, number, and velocity of particles hitting, and reflecting from the surface per second.

Although the meter was calibrated by measuring the film thickness deposit in a given time for a constant position of the vane, such calculation was only applicable to a particular vane in one position relative to the vapor source. Further, the calibration may require correction for the condensation coefficient of the material on itself.

It would be desirable to provide an improved rate meter which would be applicable to various materials. Such an improved rate meter would be advantageous if no restoring force was necessary, and if it measured evaporation rate, which does not depend on the sticking coefficient, and does not need a particular rest point position.

The present invention is directed to an improved evaporation rate meter which eliminates a restoring force, eliminates the rest point, is sensitive at low deposition rates, is applicable to various materials, is not affected by electrical surroundings, and is independent of the residual pressure in the vacuum system. The evaporation rate is important in determining the deposition rate of a film of the evaporant material on a substrate because deposition rate is proportional to the evaporation rate.

It is an object of my invention to provide an improved evaporation rate meter.

It is another object of my invention to provide an evaporation rate meter which employs a cylinder thereby eliminating a restoring force.

It is a further object of my invention to provide an improved evaporation rate meter, which will measure the deposition rate of various materials, and which is independent of electrical surroundings and the residual pressure in the vacuum system.

In carrying out my invention in one form, an evaporation rate meter comprises a cylinder rotatable about its axis, means for directing a vapor stream of evaporated material upon selected areas of the cylinder to produce an angular movement of the cylinder, torsion means for suspending the cylinder, and measuring means for reflecting a change in angular movement of the cylinder.

These and various other objects, features and advantages of the invention will be better understood from the following description taken in connection with the accompanying drawings in which:

FIGURE 1 is a perspective view of an evaporation rate meter embodying my invention;

FIGURE 2 is a perspective view of the cylinder shown in FIGURE 1 of the drawing.

Figure 3:
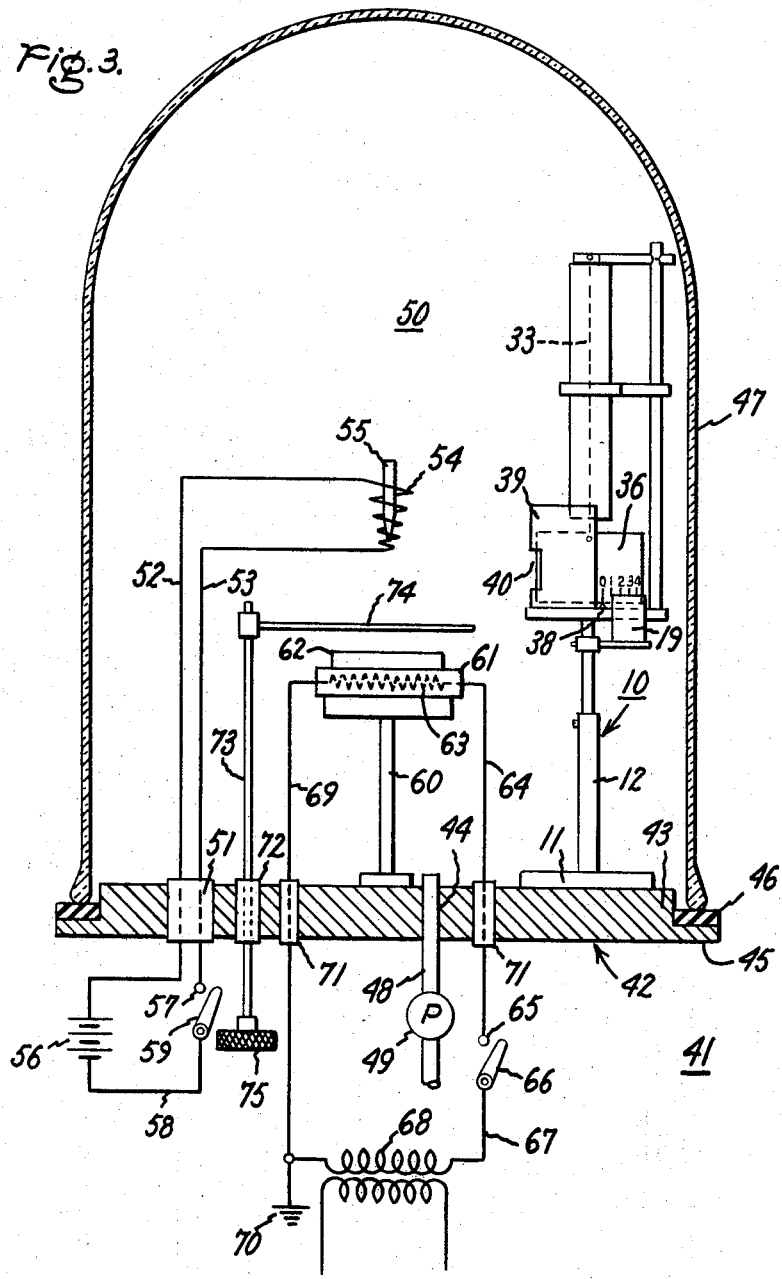
FIGURE 3 is a sectional view of a vacuum apparatus in which the evaporation rate meter of the present invention is employed.

In FIGURE 1 of the drawing, an evaporation rate meter is shown generally at 10 which comprises a base 11 to support the structure, a rod 12 mounted on base 11, and supporting thereon a platform 13. Rod 12 has a lower fixed portion 14, and an upper adjustable portion 15 which is positioned by a set screw 16. A rod 17 is positioned horizontally with respect to rod 12 on upper portion 15 of rod 12 by an adjustable holder 18 mounted on portion 15 and provided with a set screw. Magnetic damping means, in the form of a magnet 19 supported on rod 17, extends through an opening in platform 13, and is provided with a groove near its upper surface. A support rod 21, which is affixed to the upper surface of platform 13 has a holder 22 adjustably mounted thereon by means of a set screw 23. A member 24 is attached to holder 22 and supports at its opposite end a holder 25 with a set screw 26. An evaporation protective tube 27 of glass or other suitable material is supported adjustably by holder 25.

An aperture 28 is provided through rod 21 near its upper end. A rod 29 is supported by being positioned through aperture 28 and held in place by a set screw 30. Rod 29 extends horizontally from rod 21 with the leftward portion of rod 29 remote from rod 21 being positioned adjacent the upper end of tube 27. The leftward portion of rod 29 is shown as having a split segment 31 which is held thereon by a screw 32. The purpose of the segment 31 and screw 32 is to position and hold one end of a torsion wire 33 which extends downwardly therefrom. Various other suitable means of supporting the upper end of wire 33 may be employed. Wire 33 which provides the torsion means for the deposition rate meter 10 is shown in the form of a 0.001 inch diameter tungsten wire.

As is best shown in FIGURE 2 of the drawing, the opposite end of torsion wire 33 is affixed to a horizontal rod 34 mounted in a pair of apertures 35 near the upper edge of a hollow cylinder 36. The cylinder is preferably a thin-walled aluminum cylinder two inches in diameter and two inches long. The lower edge of cylinder 36 is calibrated as at 37 in units from 0 to 36 which represents 0 to 360 degrees.

As it is shown in FIGURE 1, cylinder 36 is supported above the upper surface of platform 13 by torsion wire 33 and is free to rotate about its axis. Cylinder 36 moves within groove 20 of magnet 19. Measuring means are shown as a fixed pointer 38, which is suitably mounted on the upper surface of platform 13, so that it is associated with scale 37 and adapted to reflect a change in angular movement of cylinder 36. Other measuring means can be employed. A shield 39 is shown supported on platform 13 and surrounding a portion, preferably at least one-half of cylinder 36. Such a shield is employed when the evaporant stream is not focused. The upper edge of shield 39 beyond the lower edge of tube 27 so that torsion wire 33 is not exposed to evaporation material during operation. An opening 40 is provided in shield 39 thereby exposing a portion of cylinder 36 to a directional flow vapor stream (not shown) during evaporation of a material, the rate of which is to be determined by meter 10. Pointer 38 is preferably located at a point outside of shield 39 so that the change from the initial setting of the degree scale on cylinder 36 to a subsequent setting on the cylinder during employment of the device is visible to a person viewing this device.

In FIGURE 3 of the drawing there is shown evaporation rate meter 10 employed within apparatus generally shown at 41. A metal base 42 has a raised center portion 43 with aperture 44 therein and an outer rim 45 on which is positioned a rubber gasket 46. A glass bell jar 47 is positioned on gasket 46 adjacent the edge of the center portion 43 of base 42. An evacuation line 48 is positioned in aperture 44 and is regulated by a pump 49 to evacuate a chamber 50 defined by bell jar 47 and center portion 43 of base 42. An electrically insulating sleeve 51 is provided in center portion 43 of metal base 42 for extending into and positioning a pair of leads 52 and 53 in chamber 50. A heating coil 54 in the form of a basket is positioned within chamber 50 from leads 52 and 53 and is located near the center of chamber 50. A rod 55 of metal such as tin which is adapted to be melted by heating coil 54 is shown contained within the coil. Lead 52 extends outwardly from bell jar 47 through sleeve 51 and is connected to the positive terminal of a variable DC electrical power supply 56. Lead 53 extends outwardly from bell jar 47 through insulating sleeve 51 to a terminal 57. A lead 58 connects the negative terminal of power supply 56 to a switch 59 which is adapted to contact terminal 57 of lead 53.

A pedestal 60 is mounted on the upper surface of center portion 43 of metal base 42. A heater 61 is supported on pedestal 60 to provide heat for a glass substrate 62 shown positioned on the upper surface of heater 61. Heater 61 is shown as a member of quartz, mica, or Vycor, which has a heating element 63 in the form of a filament extending therethrough. A lead 64, which is connected to one end of filament 63, has a terminal 65 which is adapted to be contacted by a switch 66. A lead 67 is connected from a variable transformer 68 to switch 66. A second lead 69, which is connected to the opposite end of filament 63, is connected to variable transformer 68 and grounded at 70. Transformer 68, which is connected to 115 volt, AC current supply, provides a 0–40 volt 0–5 ampere range power source to heat filament 63 in heater 61. Thus, the temperature of substrate 62 can be raised to values in excess of 1000° C. Leads 64 and 69 extend through center portion 43 of metal base 42 by means of electrically insulating sleeves 71.

An electrically insulating sleeve 72 is provided also in center portion 43 of metal base 42. A rod 73 is positioned within sleeve 72 and extends inwardly to chamber 50 and outwardly therefrom. At the end of rod 73 within chamber 50, there is connected a shutter plate 74 which is shown positioned between substrate 62 and heating coil 54 with tin rod 55 therein. Shutter 74 is pivoted away from and toward substrate 62 by means of a knob 75 located at the end of rod 73 outside of bell jar 50.

Device 10 is shown positioned within bell jar 50 with opening 40 in shield 39 directed toward heating coil 54 with tin rod 55 therein. Fixed pointer 38 which is associated with the degree scale on cylinder 36 is easily read through bell jar 47 during the operation of device 10 during a deposition of material on substrate 62.

I discovered that an improved deposition rate meter could be provided which comprised a cylinder rotable about its axis, means for directing a vapor stream of evaporated material upon selected areas of the cylinder to produce an angular movement of the cylinder, torsion means for suspending the cylinder, and measuring means for reflecting a change in angular movement of the cylinder. One measuring means comprises a 360 degree scale calibrated on the cylinder, and a fixed pointer associated with the cylinder. I found further a shield should be employed when a non-focused evaporant stream is used so that deflection of the cylinder is accomplished. The shield surrounds preferably at least one-half of the cylinder. The shield may be employed also around the evaporant source, or between the source and the cylinder. I found also that magnetic damping means are preferable for the cylinder to prevent oscillations.

I found further that since the geometry of the cylinder exposed to the directional flow vapor source does not change, a restoring torque does not have to be applied externally. I found that since only angles are measured, no particular null point is required. I found further that the device is extremely stable, is unaffected by the background pressure in the vacuum system, and measures the total number of impinging atoms, regardless of their sticking probability.

I found further that my rate meter will measure the evaporation rate of any material, metal or nonmetal, opaque or transparent. The device is not affected by the electrical surroundings such as the presence of high energy electrons or ions. I found further that the device is useful independent of the residual pressure in the vacuum system.

The operation of the evaporation rate meter 10 in FIGURES 1 and 2 of the drawing is described in connection with the measurement of the evaporation rate of tin which is accomplished in the apparatus shown in FIGURE 3 of the drawing. The apparatus was set up in accordance with FIGURE 3 of the drawing including the evaporation rate meter 10 therein, as described above. A rod of tin 55 was employed in the basket heating coil 54. A substrate 62 of fused silica was employed which had the dimensions of one inch by one quarter inch by 0.04 inch. The substrate 62 was positioned on heater 61. Shutter 74 was positioned between substrate 62 and heating coil 54. Bell jar 47 was positioned on rubber gasket 46 and its inner edge was adjacent to center portion 43 of base member 42. Pump 49 evacuated chamber 50 to a pressure in the range of 10–5 mm. of mercury. Switch 59 was closed by contacting terminal 57 thereby providing a current of 20 amperes through leads 52 and 53 to heat coil 54 thus raising the temperature of the tin to its evaporation temperature. Tin vapor which was produced from tin rod 55 was allowed to impinge through opening 40 in shield 39 upon cylinder 36. The vapor atoms impinged on the cylinder, resulting in momentum exchange, and caused the cylinder to turn around on its axis. The evaporation rate of the tin source was controlled by the amount of current supplied thereto to give a certain constant deflection to the cylinder. Shutter 74 was then pivoted away from substrate 62 by turning knob 75. Tin was then evaporated for a measured length of time upon substrate 62 while the evaporation rate of tin was maintained constant. Switch 59 was then opened and apparatus 41 was allowed to cool to room temperature. Chamber 50 was restored to atmospheric pressure and bell jar 47 was removed to provide access to tin coated substrate 62. The thickness of the tin film was then measured interferrometrically.

A calibration constant, $c$, in angstroms per minute-degrees was then calculated. The film thickness in the above deposition was 1600 A., the evaporation time was 10 minutes, and the angle of deflection was 100 degrees.

$$(1) \quad c = \frac{\text{film thickness}}{\text{evaporation time} \times \text{angle of deflection}}$$

$$(2) \quad c = \frac{1600 \text{ A.}}{10 \text{ minutes} \times 100 \text{ degrees}}$$

$$(3) \quad c = 1.6 + 0.2 \text{ A./min.-deg.}$$

Thus, the calibration constant, $c$, for this particular cylinder was $1.6 \pm 0.2$ A./min.-deg. For any one particular deposition of tin employing the above cylinder, the deposition rate of tin on the substrate is given by $c \times$ angle of deflection.

The evaporation rate meter of the present invention was employed to produce several tin films employing the above cylinder which had a calibration constant, $c$, of $1.6 \pm 0.2$ A./min.-deg. In each of these depositions the chamber was evacuated to a pressure of $10^{-5}$ mm. of mercury and the tin was deposited by heating a rod of tin in the coil as shown in FIGURE 3 of the drawing. Table I below sets forth the angle of deflection in each of these depositions.

TABLE I

|   | Angle of deflection |
|---|---|
| 1 | 50° |
| 2 | 100° |
| 3 | 150° |
| 4 | 200° |

Table II shows the rate of deposition of tin for each of the above depositions which is calculated by multiplying the calibration constant, $c$, by the angle of deflection obtained in each of the above depositions.

TABLE II

|   | A./min. |
|---|---|
| 1 | 80 |
| 2 | 160 |
| 3 | 240 |
| 4 | 320 |

In addition to the employment of the above rate meter to determine the rate of deposition of tin, this rate meter is of particular advantage in the codeposition of two materials such as niobium and tin. When the rate meter is employed in such a codeposition, one cylinder is calibrated as above and employed to determine the angle of deflection for the tin. A second meter is calibrated as described above and employed to determine the angle of deflection of the niobium. During the deposition a shield is employed between the nobium and tin sources. It is of particular advantage to produce a thin film of niobium tin, $Nb_3Sn$.

While other modifications of the invention and variations thereof which may be employed within the scope of the invention have not been described, the invention is intended to include such that may be embraced within the following claims.

What I claim as new and desire to secure by Letters Patent of the United States is:

1. An evaporation rate meter comprising a cylinder rotatable about its axis, means for directing a vapor stream of evaporated material upon selected areas of said cylinder to produce an angular movement of said cylinder, torsion means suspending said cylinder, and measuring means for reflecting a change in angular movement of said cylinder.

2. An evaporation rate meter comprising a cylinder rotatable about its axis, shielding means overlying a portion of said cylinder for directing a vapor stream of evaporated material upon selected areas of said cylinder to produce an angular movement of said cylinder, torsion means suspending said cylinder, measuring means for reflecting a change in angular movement of said cylinder, and magnetic damping means for said cylinder.

3. An evaporation rate meter comprising a hollow cylinder rotatable about its axis, a torsion wire suspending said cylinder, a degree scale calibrated on said cylinder, a fixed pointer associated with the scale of said cylinder and adapted to reflect a change in angular movement of said cylinder, a fixed magnet having a groove therein, said cylinder adapted to move within said groove during rotation, and shielding means overlying a portion of said cylinder, said shielding means having an opening therein to direct a vapor stream of evaporated material upon selected areas of said cylinder to produce an angular movement of said cylinder.

References Cited

UNITED STATES PATENTS

| 2,602,332 | 7/1952 | Turner | 73—430 |
| 3,050,981 | 8/1962 | Schwarz | 73—15 |
| 3,240,060 | 3/1966 | Doyle | 73—194 |
| 3,297,944 | 1/1967 | Nektaredes | 324—33 |

JAMES J. GILL, *Primary Examiner.*

E. E. SCOTT, *Assistant Examiner.*